United States Patent
Menard et al.

(10) Patent No.: US 7,035,762 B2
(45) Date of Patent: Apr. 25, 2006

(54) SYSTEM AND METHOD FOR TRACKING UTILIZATION DATA FOR AN ELECTRONIC DEVICE

(75) Inventors: Jerome Menard, Hull (CA); Kenneth Glenn MacQueen, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 10/192,162

(22) Filed: Jul. 11, 2002

(65) Prior Publication Data

US 2004/0010392 A1    Jan. 15, 2004

(51) Int. Cl.
| | |
|---|---|
| G04F 1/00 | (2006.01) |
| G04F 10/00 | (2006.01) |
| G04F 3/00 | (2006.01) |
| G04F 5/00 | (2006.01) |
| G04F 7/00 | (2006.01) |

(52) U.S. Cl. .................................................. 702/178
(58) Field of Classification Search ........ 702/178–179, 702/186–188, 58, 62, 128; 703/22; 710/102; 364/552, 551.01, 569; 370/219, 352; 235/449; 713/201, 502; 379/144; 455/573; 714/45, 714/47; 395/200.11, 835–839
See application file for complete search history.

(56) References Cited

U.S. PATENT DOCUMENTS

| | | | | | |
|---|---|---|---|---|---|
| 4,590,550 | A | * | 5/1986 | Eilert et al. ................... 714/45 |
| 5,301,122 | A | * | 4/1994 | Halpern ........................ 702/62 |
| 5,400,267 | A | * | 3/1995 | Denen et al. ................ 364/552 |
| 5,466,920 | A | * | 11/1995 | Nair et al. .................... 235/449 |
| 5,572,672 | A | * | 11/1996 | Dewitt et al. ................. 714/47 |
| 5,654,905 | A | * | 8/1997 | Mulholland et al. ........ 702/186 |
| 5,724,260 | A | * | 3/1998 | Klein .......................... 702/186 |
| 5,774,535 | A | * | 6/1998 | Castro ......................... 379/144 |
| 5,852,351 | A | | 12/1998 | Canada et al. |
| 6,029,211 | A | * | 2/2000 | Nakasima .................... 710/102 |
| 6,076,050 | A | * | 6/2000 | Klein .......................... 702/188 |
| 6,170,064 | B1 | * | 1/2001 | Lee ............................. 713/502 |
| 6,351,452 | B1 | * | 2/2002 | Koenig et al. .............. 370/219 |
| 6,369,472 | B1 | | 4/2002 | Grimm et al. |
| 6,389,542 | B1 | * | 5/2002 | Flyntz ......................... 713/201 |
| 6,427,132 | B1 | * | 6/2002 | Bowman-Amuah .......... 703/22 |
| 2002/0001302 | A1 | * | 1/2002 | Pickett ........................ 370/352 |
| 2002/0107054 | A1 | * | 8/2002 | Fujisawa et al. ............. 455/573 |

* cited by examiner

*Primary Examiner*—Michael Nghiem
*Assistant Examiner*—Aditya S. Bhat
(74) *Attorney, Agent, or Firm*—Marks & Clerk; Richard J. Mitchell (57) ABSTRACT

There is provided a system and method for tracking utilization data for an electronic device, the electronic device having a non-volatile data storage component associated therewith for retaining the utilization data. In an embodiment, the method includes the steps of: a) after passage of a utilization interval, reading a first utilization data value for the electronic device stored in the non-volatile data storage component; b) incrementing said read value; and c) storing said incremented value into the non-volatile data storage component. In an embodiment, the electronic device is a circuit card operating in a communication switch, and the utilization data value is a time value indicating cumulative time of operation of the circuit card in the communication switch.

13 Claims, 8 Drawing Sheets

SYSTEM AND METHOD FOR TRACKING UTILIZATION DATA FOR AN ELECTRONIC DEVICE

FIELD OF THE INVENTION

The invention relates to a system and method for tracking utilization data for an electronic device, such as a circuit card, which is typically installed in a system, such as a communication switch.

BACKGROUND OF THE INVENTION

As with all types of manufactured goods, electronic systems can fail. In particular, a circuit card of an electronic system may fail if an electrical component, such as an IC or resistor, on the circuit card fails. The electrical component may fail if the circuit card is exposed to environmental conditions which exceed the normal operating parameters of the circuit card. For example, the electrical component may fail if it is exposed to an excessive voltage, an electrostatic discharge, or excessive heat. Further, even simply powering and operating the circuit card causes wear and ageing of the electrical component.

In a larger electronic system, such as a communication switch, functionality for the system is provided in several circuit cards. As noted above, any one of the circuit cards may fail when the system is in use. Typically, the circuit cards may be replaced in the field at the installation location of the system. A circuit card may fail after the system has been operating for a period of time or even on the initial use of the circuit card in the system. In the latter failure, the circuit card is essentially "dead on arrival".

For communication switches, a switch vendor may provide a replacement circuit card to the switch owner when a circuit card is dead on arrival. In many circumstances, however, a faulty circuit card will only be replaced if the faulty card is a new, unused circuit card. Circuit cards which fail after they are installed and utilised are usually covered by a warranty and repair policy. It will be appreciated that for large circuit cards; the costs to replace a faulty circuit card may greatly exceed the costs to repair a faulty circuit card. In order to determine whether the repair obligations of the switch vendor are to replace the circuit card or repair the circuit card, it would be necessary to determine if the faulty circuit card is new and unused or not new.

Provisions exist to track some date aspects of a circuit card. For example, the date of manufacture of a circuit card is normally recorded or associated with a manufacturing serial number imprinted onto the card. However, a serial number does not indicate whether the circuit card was installed and utilised or whether the circuit card was not used and simply sat on a shelf as a spare as in a product distribution center or at a customer site.

Accordingly, there is a need for a system and method for tracking the utilization of circuit cards, when installed and operating in a system.

SUMMARY OF THE INVENTION

In a first aspect, there is provided a method of tracking utilization data for an electronic device, the electronic device having a non-volatile data storage component associated therewith for retaining the utilization data, comprising the steps of:
  a) after passage of a utilization interval, reading a first utilization data value for the electronic device stored in the non-volatile data storage component;
  b) incrementing the read value; and
  c) storing the incremented value into the non-volatile data storage component.

In an embodiment, the electronic device is a circuit card operating in a communication switch.

In another embodiment, the utilization interval is a time interval and the first utilization data value is a time value indicating cumulative time of operation of the circuit card in the communication switch.

In a further embodiment, the time interval is set to be a value between one minute and one week.

In another embodiment, the method further comprises the step of extracting the first utilization value from the non-volatile data storage component when the circuit card is being serviced, to determine whether the circuit card has been in operation.

In another embodiment, the non-volatile data storage component is selected from one of a SEEP, EPROM, EEPROM and flash memory and the method further comprises the step of extracting the utilization data from the non-volatile data storage component.

In another embodiment, the method further comprises the steps of:
  a) after passage of the utilization interval, reading a second utilization data value for the electronic device stored in the non-volatile data storage component;
  b) incrementing the read second value; and
  c) storing the incremented second value into the non-volatile data storage component.

In another aspect, there is provided a method of tracking utilization data for an electronic device, the electronic device having a non-volatile data storage component associated therewith for retaining the utilization data, comprising the steps of:
  a) waiting for a passage of a utilization interval; and
  b) incrementing a first utilization data value stored in a non-volatile storage component.

In an embodiment, the electronic device is a circuit card operating in a communication switch.

In another embodiment, the utilization interval is a time interval and the first utilization data value is a time value indicating cumulative time of operation of the circuit card in the communication switch.

In a further embodiment, the time interval is set to be a value between one minute and one week.

In another embodiment, the non-volatile data storage component is selected from one of a SEEP, EPROM, EEPROM and flash memory and the method further comprises the step of extracting the utilization data from the non-volatile data storage component.

In another aspect, there is provided a system for tracking utilization data for an electronic device, comprising:
  a) a non-volatile data storage component associated with the electronic device, said non-volatile data storage component providing storage of at least one utilization data value relating to the electronic device; and
  b) a programmable device programmed to read said at least one utilization data value after passage of a utilization interval, increment said utilization data value and store said utilization data value into the non-volatile data storage component.

In an embodiment, the electronic device is a circuit card operating in a communication switch.

In another embodiment, the utilization interval is a time interval, and the utilization data value is a time value indicating cumulative time of operation of the circuit card in the communication switch.

In another embodiment, the time interval is a value between one minute and one week.

In another embodiment, the non-volatile data storage component is select from one of a SEEP, EPROM, EEPROM and flash memory and said non-volatile data storage component is permanently mounted to said electronic device.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Figure 1:
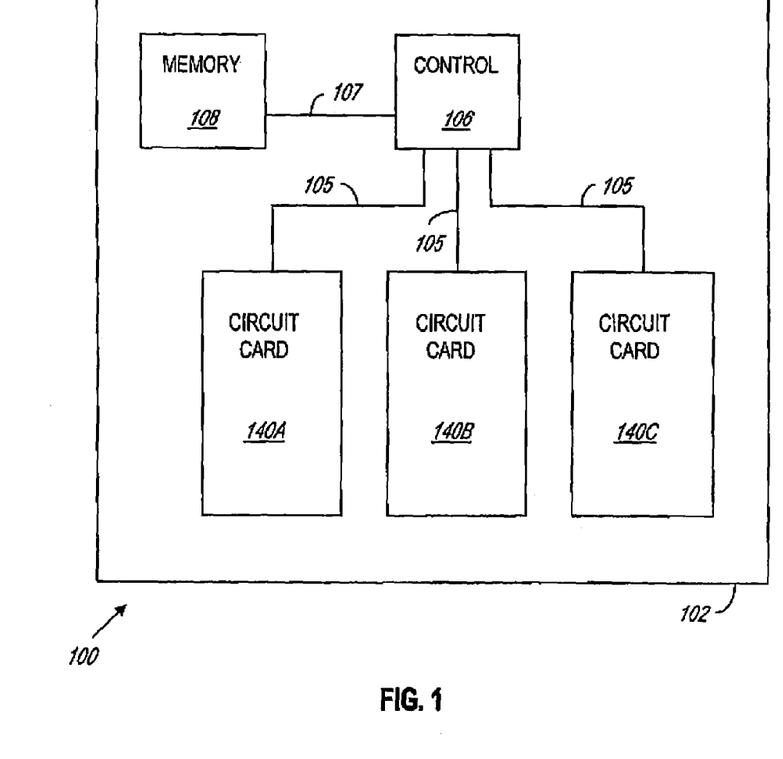
FIG. 1 is a block diagram of a communication device comprising a plurality of circuit cards with each circuit card having a monitoring system embodying the invention installed therein.

Shown in FIG. 1 and generally referred to by reference 100 is a communication switch 102 in which a plurality of electronic devices such as circuit cards 104A ... 104C are installed. The circuit cards 104A ... 104C may be connected to a control module 106 by communication links 105 over which control and data signals may pass. As shown, control module 106 is also connected to a memory 108 by a memory access path 107. In operation, the control module 106 may control the operation of the circuit cards 104 by running software programs stored in, and accessed from, the memory 108.

In the context of this application, and the purposes of tracking the operating time of a circuit card 104A ... 104C, a circuit card 104A ... 104C is considered to be "operating" when it is installed into communication switch 102 and powered, and the utilization tracking system of the embodiment is functioning. In other embodiments, other degrees of functionality may be used to characterize a circuit card as being "operating".

Figure 2:
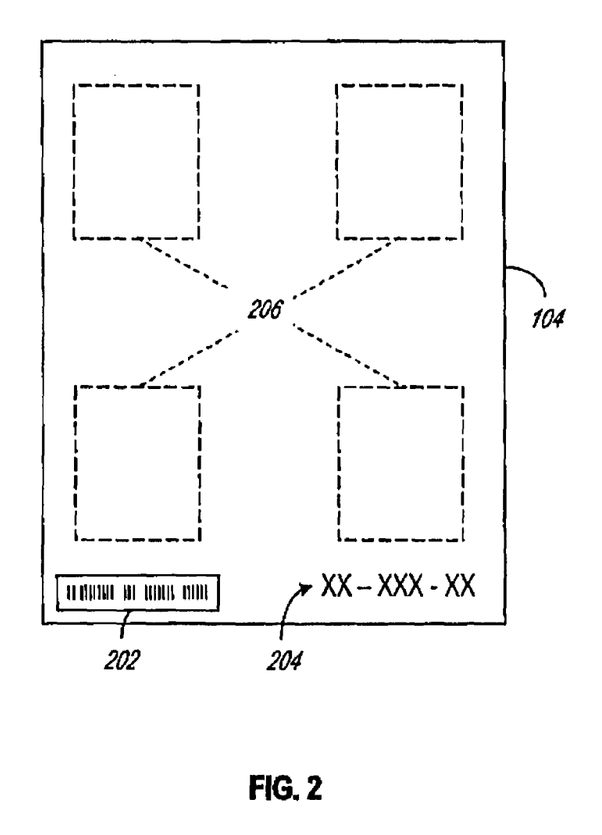
FIG. 2 is a block diagram of a circuit card of FIG. 1 showing further detail thereof, including markings provided onto the circuit card, including a serial number and the date of manufacture.

Now referring to FIG. 2, shown is an example of an electronic device such as a circuit card 104 having various forms of identification provided thereon. For example, the circuit card 104 may have attached thereto a sticker 202 providing a serial number which may contain encoded information. In an exemplary serial number such as, "200201 FRUA1", it may contain the date of assembly ("200201" meaning January 2002) and firmware revision ("FRUA1" meaning field replaceable unit revision A1"). Other administrative data may be included into the serial number. Using this information it may be possible to cross reference a specific serial number of a circuit card to a manufacturing date. Then the information may be matched against a list of components and suppliers for circuit cards made on the date, using the build of materials information related production of that circuit card. This information can be used to identify sources of failing components or to assess mean time between failure of components. Alternatively, or in addition, the circuit card 104 may have manufacturing information stamped onto a surface during assembly of the card, as indicated by way of example at reference 204. However, it will be appreciated that these indicators do not provide information of the operating time of the circuit card.

Figure 3:
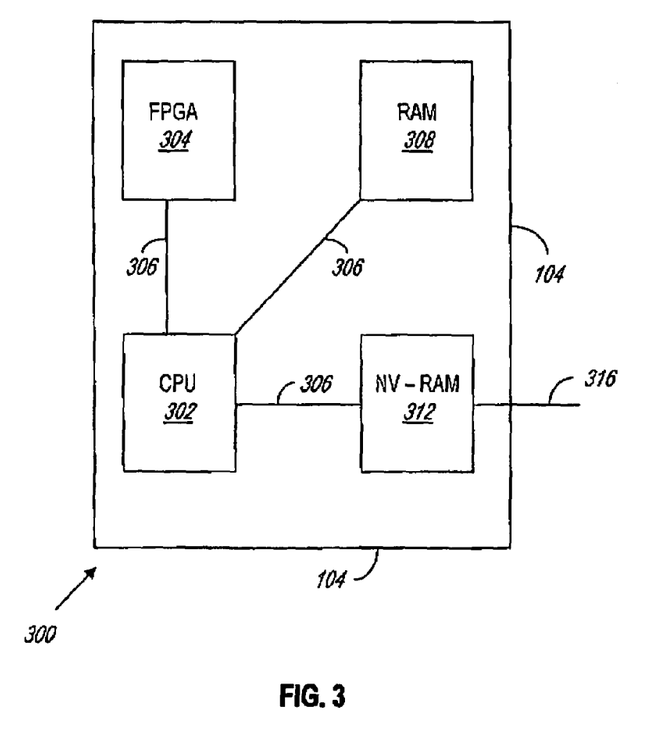
FIG. 3 is a block diagram of the circuit card of FIG. 2 further showing a non-volatile memory provided thereon which is used in the system.

Now referring to FIG. 3, shown, and generally referred to by reference 300, is a more detailed view of a circuit card 104. As shown in FIG. 3, the circuit card 104 has a number of components assembled thereon including a CPU 302, an FPGA 304, RAM 308 and a non-volatile RAM (NV-RAM) 312. The CPU 302 is connected to each of the FPGA 304, the RAM 308, and the NV-RAM 312 by communication links 306. The NV-RAM 312 may have an external connection point 316 to receive an external communication or access link (not shown). As will be described later in detail, software operating on CPU 302 uses NV-RAM 312 to store and update utilization data related to the time of use of the circuit card 104. It will be understood that the types of components and the circuits of the components are shown by way of example only, and are not meant to limit the scope of invention in any respect. However, in accordance with the invention, the circuit card 104 should have at least one non-volatile data storage component or mechanism associated with the circuit card 104, for storing data even when the circuit card 104 is not powered. In the example shown in FIG. 3, the non-volatile data storage component is embodied by the NV-RAM 312.

Figure 4:
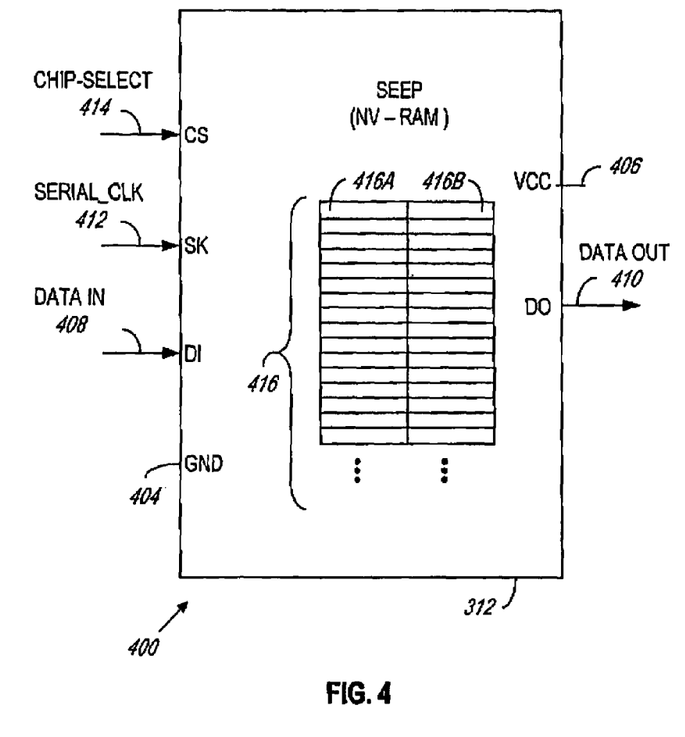
FIG. 4 is a detailed diagram of an embodiment of the non-volatile memory of FIG. 3.

Now referring to FIG. 4, shown and generally referred by reference 400 is an example of a type of NV-RAM commonly referred to in the industry as a SEEP (serial electrically erasable programmable read only memory). As will be appreciated by those skilled in the art, a SEEP 400 may be used as the NV-RAM 312 shown on FIG. 3. Other types of non-volatile data storage components may also be used including EEPROMs and flash memory. These types of NV-RAMs are listed as examples only and are not meant to be limiting. An exemplary SEEP is provided by National Semiconductors under serial number NMC 9346. In still other embodiments, electromechanical devices which can track a count may be used for the non-volatile data storage component. Such devices include a mechanical counter. In still other embodiments, the non-volatile data storage component would include an electronic counter, such as LSI and VLSI counters known in the art.

As shown in FIG. 4, SEEP 400 has typical control and power pins which are used in known configurations for memory devices. The pins include: ground pin 404, power pin 406, data input pin 408, data output pin 410, clock pin 412 and chip select pin 414. The memory elements in SEEP 400 comprise 1,024 bits of memory organised into 16 bit-length words, providing 64 addressable storage locations. Examples of two such memory locations of 16-bit length are indicated on FIG. 4 by reference 416A and 416B.

SEEP 400 is used to maintain a local, permanent and updatable record indicating the operating time of circuit card 104. In particular, in the embodiment, a memory location in SEEP 400 is used to store a value indicating the number of hours, or any time interval chosen for the embodiment, which the circuit card has been cumulatively powered. As the memory locations are 16 bits long, the locations can hold values in the range of 0 to 65,535. If the value is incremented after each hour of operation of the circuit card, the counter will wrap around at 65,535 hours. This value is close to 7½ years of usage and may be well beyond the expected life of the circuit card 104A . . . 104C. However, if a longer life was expected, it would be possible to use more than one register 416A, 416B to increase the counter capacity substantially. Another way to increase the use of the same 16 bit value would be to use 2 hour intervals which would double the life expectancy to 15 years.

As will be appreciated by those skilled in the art, data may be written to and read from the registers 416 by issuing serially encoded instructions to the SEEP 400 from an external control (e.g. CPU 302 in FIG. 3 controlled by a software routine). For example, the software may generate and send the specific control words for the SEEP 400. In the SEEP 400 used in the embodiment, the instruction consists of a start bit, followed by a two-bit operational code (read/write/erase), and six bits of address for the target memory location.

Figure 5:
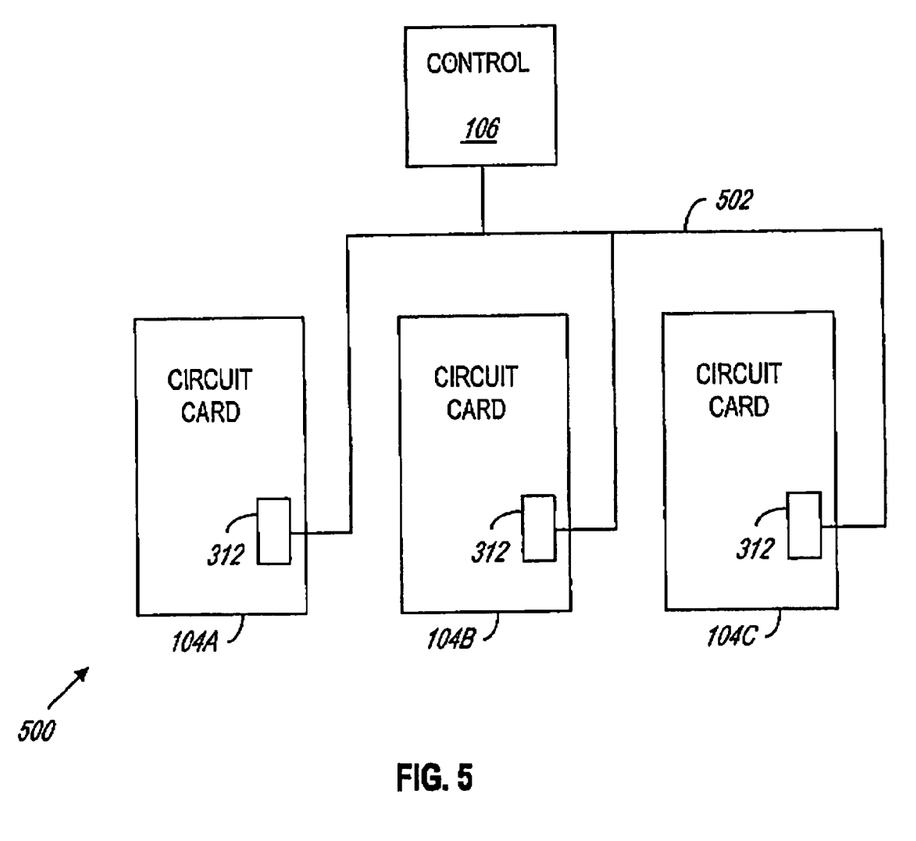
FIG. 5 is a block diagram of a plurality of circuit cards installed in the system of FIG. 1, in which non-volatile memories associated with the circuit cards are connected by a bus arrangement.

Now referring to FIG. 5, shown and generally referred to by reference 500 is a bussed arrangement for connecting the NV-RAM 312 on each of the circuit cards 104A . . . 104C to the control module 106. As shown in FIG. 5, the NV-RAMs 312 are connected to the control module 106 through a data/control bus 502. It will be understood that the bus 502 can carry control and data signals between the control module 106 and each NV-RAM 312 associated with a circuit card 104A . . . 104C. As noted, the NV-RAMs 312 may be embodied by the SEEP 400 shown in FIG. 4.

Referring back to FIG. 1, when the circuit cards 104A . . . 104C are installed and operational in communication switch 102, it is desirable to track the cumulative hours of operation of each circuit card 104A . . . 104C in the communication switch 102. Being able to track the utilization of each circuit card 104A . . . 104C in this manner would allow an equipment vendor to verify whether a circuit card 104A . . . 104C returned by a customer has been installed and utilised, or whether the circuit card 104A . . . 104C was never operating. In FIG. 5, each of the NV-RAMs 312 (such as a SEEP 400) is associated with a circuit card 104 . . . 104C and is used to track and store utilization data for the associated circuit card 104A . . . 104C. The stored utilization data is retrievable by the equipment vendor to determine utilization of the circuit card 104A . . . 104C. The process of tracking, storing and retrieving such utilization data for the circuit cards 104A . . . 104C will now be described in detail.

Figure 6A:
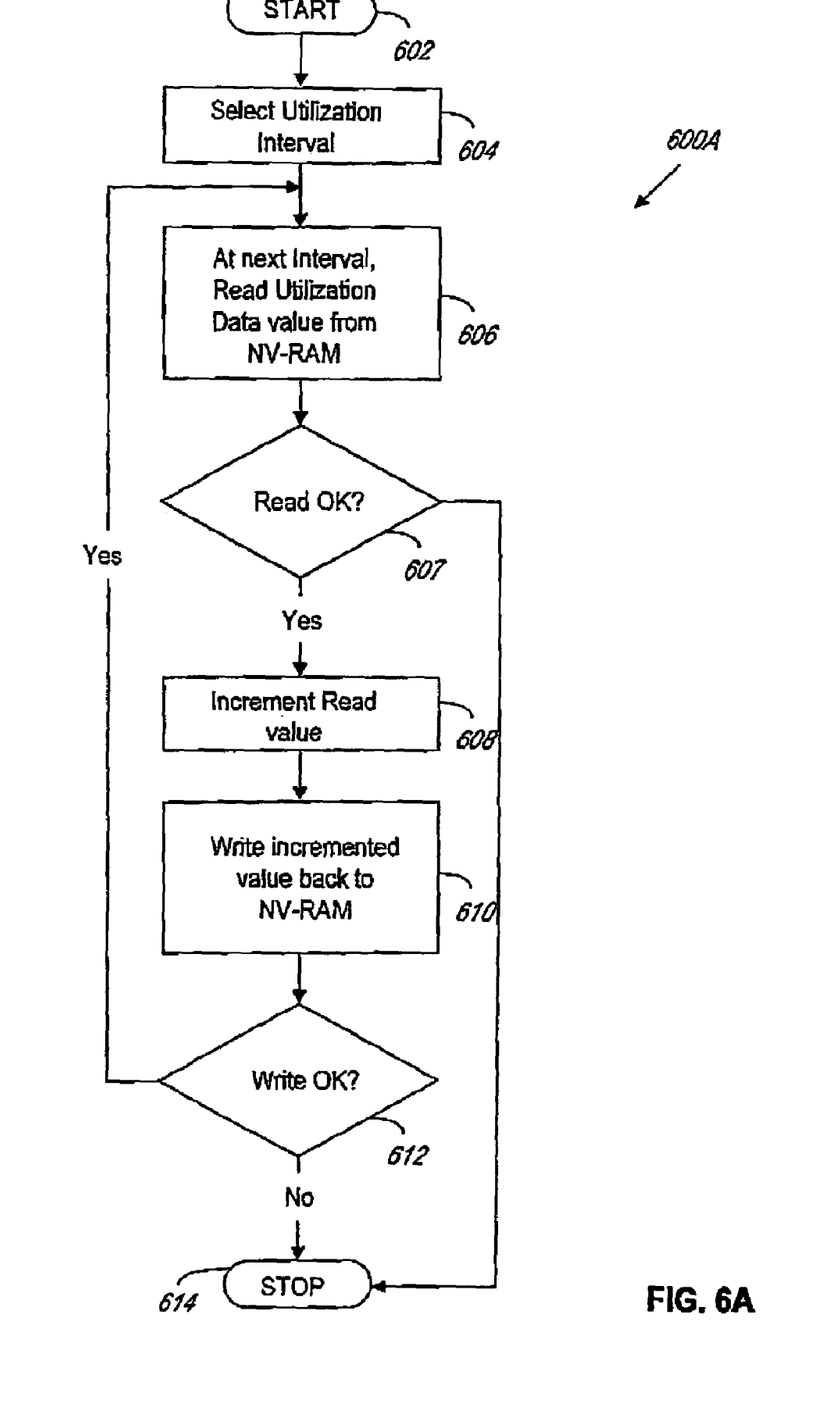
FIG. 6A is a flow chart showing an embodiment of a process for updating contents of the non-volatile memory on each circuit card.

Shown and generally referred to by reference 600A is an embodiment of a process for updating the NV-RAM 312 a circuit card 104A . . . 104C of FIG. 5. In an embodiment, process 600A may be a software program that runs in control module 106 of FIG. 5. Process 600A starts at block 602 and proceeds to block 604 where a suitable utilization interval is selected indicating the frequency of updates for the value. In an embodiment, the utilization interval may be pre-selected by the equipment vendor, say, at one hour. However, it will be appreciated that any other interval may be selected which may provide useful utilization information, ranging from a minute to a week or more, for example. Furthermore, while the utilization information is set by the equipment vendor as it is in this example, it is possible that the utilization interval-could be selected by the customer for certain other uses.

From block 604, process 600A proceeds to block 606 where, after the expiry of the next time interval, process 600A attempts to read the utilization data from an NV-RAM 312 on circuit card 104A. The timing for the interval is maintained by CPU 302. The successful reading of the utilization data at block 606 may serve as a rudimentary check that the NV-RAM 312 and the associated circuit card 104A . . . 104C is operational. If the read fails, at decision block 607, process 600A proceeds to block 614 and ends. Otherwise, if the read is successful, process 600A returns to block 608. At block 608, process 600A increments the value read at block 606 by one interval. This may be done directly via registers and appropriate commands can be used to locally increment the read value. Alternatively, the read value may be stored in local memory, such as RAM, which is accessible by CPU 302. Process 600A then proceeds to block 610 and attempts to write the incremented value back to NV-RAM 312 on circuit card 104A. If the write fails, at decision block 612, process 600A proceeds to block 614 and ends. Otherwise, if the write is successful, process 600A returns to block 608.

Thus, as described, the utilization data value stored in NV-RAM 312 is read, the read value is incremented, and the incremented value written back to the NV-RAM 312. Referring back to FIG. 4, if the SEEP 400 is used for the NV-RAM 312, the utilization data may be stored in register 416A. Following process 600A, the utilization data value is read at block 606 from register 416A through data output 410, the read value is incremented by an interval at block 608, and finally the incremented value is written at block 610 back to register 416A through data input 408. It will be appreciated that the utilization data stored in register 416A of SEEP 400 at the time of the stoppage of process 600A, represents the cumulative utilization data in register 416A up to that point in time. In the present example, with the chosen interval being an hour, the stored utilization value in register 416A will indicate the number of hours of operation of the SEEP 400 on circuit card 104A, and by extension the number of hours of operation of the circuit card 104A.

Accordingly SEEP 400 has a record indicating the total cumulative amount of intervals during which circuit card 104 has been operational. As will be explained in further detail below, it will be appreciated that the cumulative number of operational time, in hours, is not necessarily indicative of a sequential amount of operational time.

While the above example has described reading, incrementing, and writing the value of one register 416A on one NV-RAM 312 (SEEP 400) of one circuit card 104A, it will be appreciated that process 600A can be readily adapted to read, increment; and write a plurality of types of utilization data on one or more registers 416A, 416B, etc. on an NV-RAM 312 (SEEP 400). Thus, different aspects of utilization of the circuit card 104A may be tracked at the same time. Furthermore, it will be appreciated that process 600A can be readily adapted for use with other circuit cards 104B, 104C, etc. In this case, each NV-RAM 312 associated with each circuit card 104A . . . 104C will contain utilization data unique to the specific circuit card 104A . . . 104C.

Other data which may be tracked include: the time interval since the last repair of the circuit card 104, and the time interval since the last power-down of the circuit card 104. It will further be appreciated that in other embodiments, non-time based events may be tracked. Such events include: the number of packets processed by the circuit card 104, and the number of errors encountered by the circuit card 104. Still other events may be tracked by other embodiments.

Figure 6B:
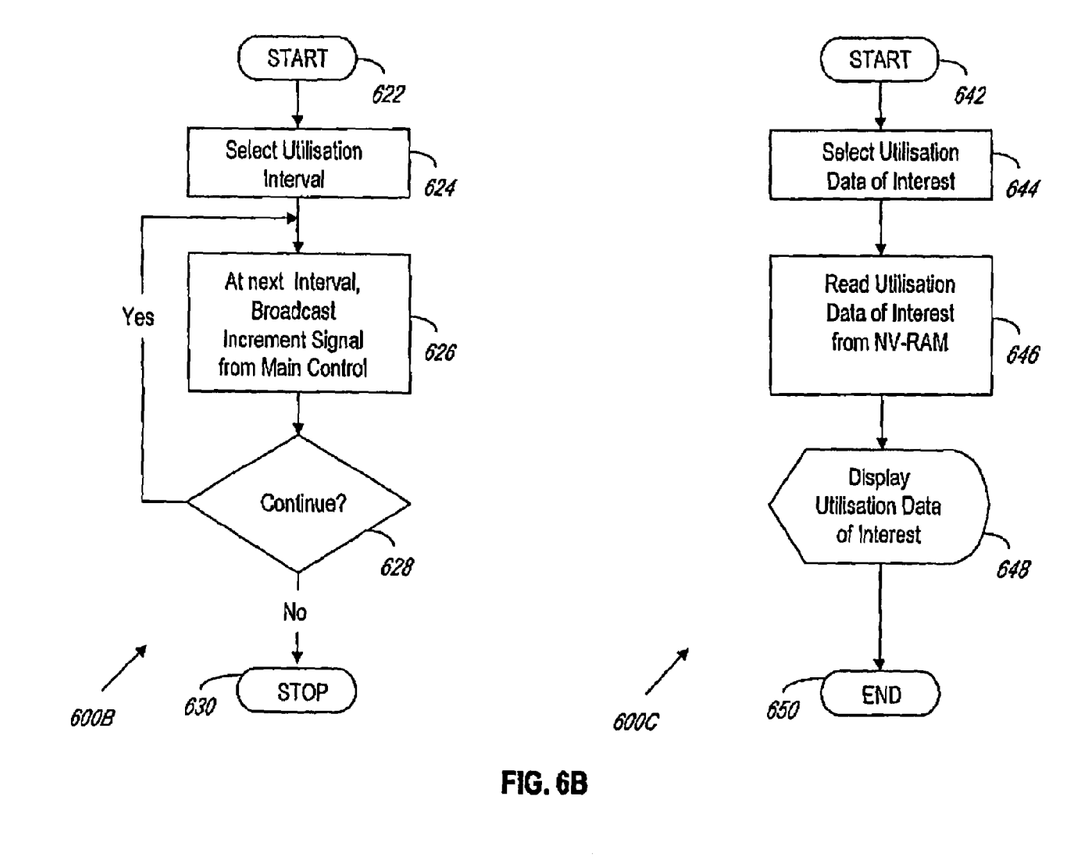
FIG. 6B is a flow chart showing another embodiment of process for updating contents of the non-volatile memory on each circuit card.

Now referring to FIG. 6B, shown and generally referred to by reference 600B is an alternative process for incrementing utilization data on NV-RAM 312 (SEEP 400). Process 600B starts at block 622 and proceeds to block 624 where a suitable utilization interval is selected. As before, this interval may be pre-selected by the equipment vendor at the factory. In this embodiment, process 600B may run on control module 106 and broadcast an increment signal at each interval at block 626. At decision block 628, process 600B will normally loop back to block 626 unless it is discontinued by some event, such as the powering down of the communication switch 102, and stopped at block 630.

Separately, at each local control (as embodied for example by CPU 302 in FIG. 3) the broadcast increment signal is received. Software operating on local CPU 302 is then responsible for updating the respective NV-RAM 312 (SEEP 400) connected thereto. It will be appreciated that each CPU 302 may then initiate a read, increment, and write cycle to update the utilization data in the NV-RAM 312 (SEEP 400), using a process similar to that described for process 600A. In process 600B, it will be appreciated that the main control module 106 does not directly access the NV-RAM 312 on each of the circuit cards 104A . . . 104C through each increment cycle.

An embodiment also provides a means to retrieve and read the data stored in NV-RAM 312. Still referring to FIG. 6B, process 600C begins at block 642 and proceeds to block 644 where a utilization data of interest is selected. For example, the utilization data of interest may be the number of hours that the circuit card 104A . . . 104C has been in operation. At block 646, process 600C may request this utilization data of interest from the NV-RAM 312, either directly, or indirectly through the local control (CPU 302). The extracted utilization data of interest may then be displayed as shown at block 648. Process 600C then ends at block 650.

It will be appreciated a process analogous to process 600C may also be used by an equipment vendor when a circuit card 104A is returned by a customer to a servicing facility. A repair station for the circuit card 104 will have an appropriate connection interface to power-up and read the values stored in SEEP 400. As the NV-RAM 312 (SEEP 400) on the circuit card 104A will contain the utilization data that was updated when the card was in operation, the equipment vendor can access the NV-RAM 312 (SEEP 400) to determine the amount of usage of the circuit card 104. Then, using that data, the equipment vendor can decide whether the circuit card 104A should be dealt with under the replacement policy, or whether it should be dealt with under the repair and maintenance policy. The connection interface may be configured to provide appropriate power signals to SEEP 400. The connection interface may not necessarily provide power signals to other components on circuit card 104A. Accordingly, the repair station provides a system to check the utilization data contained in SEEP 400 without having to power up the entire circuit card 104A.

It will be appreciated that such a data extraction feature would be very useful in the context of a defective circuit card 104A . . . 104C. In this embodiment, the data input pin 408 and data output pin 410, as well as the ground pin 404, chip select pin 414 and power pin 406 of the SEEP 400 would be connected to an external diagnostic device (not shown) using the external connection point 316. The diagnostic device would provide power to the SEEP 400 using the power pin 406. In an embodiment, the power pin 406 is an isolated power plane signal that protects the circuit card 104 from drawing power from the diagnostic device while the circuit card 104A . . . 104C is not powered. The diagnostic device, by controlling each pin and following the manufacturer's access method for the SEEP 400, is able to read the registers 416A and 416B found in the SEEP 400.

In other embodiments a process similar to process 600C may be operating at a control module in the communication switch 102 or even a network management station connected to the communication switch 102. The respective control module is able to retrieve the utilization data from the circuit card 104 and evaluate an on-going running time of the card.

Figure 7:
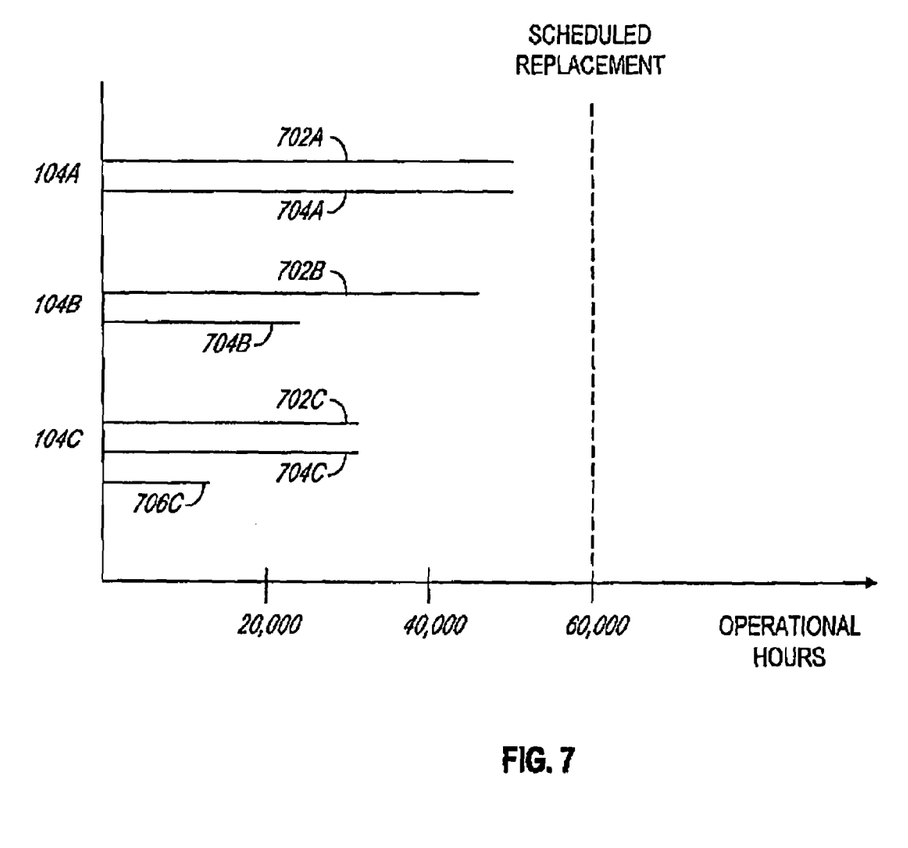
FIG. 7 is a timeline diagram showing operational hours of the circuit cards of FIG. 5, tracked using the process of FIG. 6A and FIG. 6B.

Now referring to FIG. 7, by way of example, once the utilization data in the NV-RAMs 312 associated with each circuit card 104A . . . 104C is retrieved, the data can be analysed by the equipment vendor in the following manner. In FIG. 7, circuit card 104A on the vertical axis is shown with two horizontal bars 702A, 704A. (While graphic bars are shown, the information may be provided in any number of ways, including numerical values.) In this example, the horizontal axis represents the number of operational hours. Bars 702A and 704A indicate that circuit card 104A has been in operation for approximately 50,000 hours. For example, bar 702A represents the cumulative hours of operation of circuit card 104A, and bar 704A represents the total number of hours of operation since the last repair of circuit card 104A. In this case, as both bars 702A and 704A are at 50,000 hours, indicating that circuit card 104A has been in operation for that period without any repairs. Now referring to horizontal bars 702B and 704B associated with circuit card 104B, analogously, bar 702B represents the total cumulative hours of operation of circuit card 104B and bar 704B represents the number of hours of operation since the last repair of circuit card 104B. In this case, bar 704B indicates that the circuit card 104B has been in operation approximately 20,000 hours since the last repair. Also, bar 702B indicates that the circuit card 104B has been in operation for almost as long as circuit card 104A. The difference in cumulative operational hours between circuit cards 104A and 104B may be explained by the fact that circuit card 104B may have been removed for servicing.

Now referring to horizontal bars 702C, 704C and 706C associated with circuit card 104C, bar 702C shows that circuit card 104C has been in operation for approximately 30,000 hours and bar 704C, also at 30,000 hours, shows that the circuit card 104C has not been serviced in that time. The third horizontal bar 706C may track some other piece of utilization data for circuit card 104C, whatever that may be. The value of this third piece of data is shown to be approximately 10,000 hours. Tracking this third piece of utilization data would require the use of an additional register 416 in the NV-RAM 312 (SEEP 400) discussed earlier in reference to FIG. 4.

Finally, FIG. 7 shows in dotted line a scheduled replacement point at 60,000 hours. In order to pre-emptively avoid failure of the circuit cards 104A . . . 104C during operation, it may be preferable to predetermine the number of service hours expected of the circuit cards 104A . . . 104C and then replace them at that time. As will be appreciated, tracking the number of utilization hours in software and setting a flag once the replacement schedule is reached would allow the customer to become aware that it is time to replace a circuit card 104A . . . 104C.

It will be appreciated that in other embodiments, other memory systems may be used instead of a local SEEP 400. For example a compact flash memory device may also be used. Alternatively, the information stored locally on a SEEP 400 may, in other embodiments, be stored centrally with other data from other circuit cards. However, it will be appreciated that for those alternatives, there must be some mechanism to ensure that the data being accessed is legitimate and has not been tampered or altered without authorisation. Storing data centrally introduces more difficulties in maintaining security and integrity for the data. An advantage of using SEEP 400 or mounted flash memory is that the device is physically secured to the circuit card and generally cannot be readily replaced by an unauthorised person.

In other embodiments, the utilization data may be stored in the NV-RAM after being encrypted in some manner, to prevent or facilitate detection of the tapering of the data. Exemplary, but not limiting encryption methods include using an offset value, a CRC value, a checksum and a hashing value against the actual data.

It is noted that those skilled in the art will appreciate that various modifications of detail may be made to the present embodiment, all of which would come within the scope of the invention.

We claim:

1. A method of tracking utilization data for a removable circuit card operating in a communication switch, comprising the steps of:
   providing a non-volatile data storage component for retaining the utilization data on the removable circuit card,
   after passage of a utilization interval, reading a first utilization data value for the circuit card stored in the non-volatile data storage component;
   incrementing the first utilization data value to represent passage of the utilization intertval; and
   writing the incremented utilization data value to the non-volatile data storage component, wherein the utilization interval is a time interval between one minute and one week and the first utilization data value is a time value indicating cumulative time of operation of the circuit card in the communication switch.

2. The method recited in claim 1, further comprising the step of extracting the first utilization value from the non-volatile data storage component when the circuit card is being serviced, to determine whether the circuit card has been in operation.

3. The method recited in claim 2, wherein the non-volatile data storage component is selected from one of a SEEP, EPROM, EEPROM and flash memory and the method further comprises the step of extracting the utilization data from the non-volatile data storage component.

4. The method recited in claim 1, further comprising the steps of:
   after passage of the utilization interval, reading a second utilization data value for the circuit card stored in the non-volatile data storage component;
   incrementing the read second value; and
   writing the incremented second value into the non-volatile data storage component.

5. The method recited in claim 4, wherein the second utilization value is a cumulative measure of operation of the circuit card since last servicing the circuit card.

6. The method recited in claim 1, further comprising the steps of:
   after passage of the utilization interval, reading a plurality of additional utilization data values stored in the non-volatile data storage component on the circuit card;
   incrementing each read additional value; and
   storing the incremented additional values into the non-volatile data storage component.

7. A method of tracking utilization data for two or more removable circuit cards operating in a communication device, comprising the steps of:
   providing a non-volatile storage component on each of said cards for retaining utilization data associated with each card;
   providing a control module in communication with each circuit card;
   waiting for passage of a utilization interval at said control module;
   at said control module, triggering incrementing a utilization data value stored in the non-volatile storage component of each circuit card; and
   at each two or more circuit cards, storing an incremented utilization data value stored in the non-volatile storage component of each circuit card; and
   at each two or more circuit cards, storing an incremented utilization data value to the associated non-volatile storage component to represent passage of the utilization interval, wherein the utilization interval is a time interval and the first utilization data value is a time value indicating the cumulative time of operation of the circuit cards in the communication switch and the time interval is set to be a value between one minute and one week.

8. The method recited in claim 7, wherein the non-volatile data storage component is selected from one of a SEEP, EPROM, EEPROM and flash memory and the method further comprises the step of extracting the utilization data associated with each circuit card from the non-volatile data storage component of each circuit card.

9. A system for tracking utilization data for two or more circuit cards operating in a communication device, comprising:
   a non-volatile storage component mounted on each circuit card of said communication switch, said non-volatile storage component providing storage of a utilization data value relating to each said circuit card, and
   a programmable device programmed to read said utilization data value from at least two of said two or more circuit cards after passage of a utilization interval,
   increment said utilization data values associated with said two or more circuit cards to represent passage of the utilization interval and write said respective utilization data values into the non-volatile data storage component of said at least two of said two or more circuit cards,
   wherein the utilization interval is a time interval, and the first utilization data value is a time value indicating the cumulative time of operation of the associated circuit card in the communication switch and the time interval is a value between one minute and one week.

10. The system recited in claim 9, wherein, the non-volatile data storage component is select from one of a SEEP, EPROM, EEPROM and flash memory and said non-volatile data storage component is permanently mounted to said electronic device.

11. A method of tracking utilization data for a removable circuit card operating in an electronic device, the circuit card having a non-volatile data storage component associated therewith for retaining the utilization data, comprising the steps of:

providing a non-volatile data storage component on said removable circuit card;

after passage of a utilization interval, reading a first utilization data value for the circuit card stored in the non-volatile data storage component;

incrementing the first utilization data value to represent passage of the utilization interval; and writing the incremented utilization data value to the non-volatile data storage component, wherein the utilization interval is a time interval and the first utilization data value is a time value indicating cumulative time of operation of the circuit card in the electronic device.

12. The method recited in claim 11, further comprising the step of extracting the first utilization value from the non-volatile data storage component when the circuit card is being serviced, to determine whether the circuit card has been in operation and wherein the time interval is set to be a value between one minute and one week.

13. The method recited in claim 12, wherein the non-volatile data storage component is selected from one of a SEEP, EPROM, EEPROM and flash memory.

* * * * *